United States Patent
McMullen

[15] 3,643,904
[45] Feb. 22, 1972

[54] PIN-MOUNTING MEANS

[72] Inventor: Larry Gene McMullen, Dubuque, Iowa
[73] Assignee: Deere & Company, Moline, Ill.
[22] Filed: Dec. 8, 1969
[21] Appl. No.: 882,925

[52] U.S. Cl..................248/289, 74/105, 92/161, 212/66, 214/138, 287/100
[51] Int. Cl...............................................F16h 21/44
[58] Field of Search .................248/289, 278, 279, 285; 287/100; 214/138; 212/66, 70; 74/105; 280/96.1; 172/273; 92/161

[56] References Cited

UNITED STATES PATENTS

| | | | |
|---|---|---|---|
| 3,443,826 | 5/1969 | Hermiz | 287/100 |
| 2,037,209 | 4/1936 | Buckwalter | 287/100 |
| 3,430,503 | 3/1969 | McLaughlin | 74/105 |
| 3,134,605 | 5/1964 | Cadiou | 287/100 X |
| 3,347,577 | 10/1967 | Carlson et al. | 287/100 |
| 3,330,420 | 7/1967 | Walker | 212/68 |

Primary Examiner—J. Franklin Foss
Attorney—H. Vincent Harsha, Harold M. Knoth, William A. Murray and John M. Nolan

[57] ABSTRACT

Means for mounting a pin between two spaced mounting plates utilizing a pin having tapered end portions, each of which is fitted with a complementary, internally tapered sleeve, each sleeve, in turn, being received in an appropriate aperture in its respective mounting plate. The sleeve received in the first mounting plate is provided with a shoulder to restrict its movement in a direction away from the second mounting plate, while the sleeve received in the second mounting plate is provided with a lock mechanism to urge the pin toward the first mounting plate and thus hold it rigidly in accurate alignment between the two plates.

7 Claims, 3 Drawing Figures

PATENTED FEB 22 1972 3,643,904

INVENTOR.
LARRY G. McMULLEN

3,643,904

PIN-MOUNTING MEANS

BACKGROUND OF THE INVENTION

This invention relates generally to a backhoe, and particularly to a pin-mounting means for supporting a hydraulic cylinder on the backhoe frame. More particularly, the invention relates to a means for rigidly mounting a pin in accurate alignment between two spaced plates.

The pin-mounting means of the present invention provides a highly desirable method for accurately locating and rigidly mounting a pin between two spaced mounting plates. The method is particularly adapted to mount the trunnion pins which support the swing cylinders utilized on a swing-type backhoe, such as that illustrated in U.S. Pat. No. 3,047,171 issued to Long on July 31, 1962. Although the trunnion pins illustrated therein are each mounted on a single member, it has been found structurally desirable to utilize a double wall member such as that described and illustrated herein rather than the single member shown in Long.

The use of a double wall member gives rise to particular problems in mounting the swing cylinder trunnion pins, however, which the present invention successfully overcomes. One such problem is that of accurately locating the pin between the two mounting walls or plates of the structural member. Further problems arise in that the pin must be held rigidly in place, yet be easily and quickly removable. Additionally, it is important that the mounting means be easy and inexpensive to manufacture.

SUMMARY OF THE INVENTION

The pin-mounting means of the present invention utilizes a pin having tapered end portions, each of which if fitted with a complementary, internally tapered sleeve. Each sleeve is, in turn, received in a suitable aperture in one of the two spaced mounting plates such that it is generally free to move in the axial direction of the pin. The sleeve received in the first mounting plate is provided with a shoulder which serves to restrict its movement in a direction away from the second mounting plate, while the sleeve received in the second mounting plate is provided with a lock mechanism associated with the second mounting plate by which a force may be applied to the sleeve, thereby urging it toward the first mounting plate. Since the movement of the sleeve in the first plate is limited, the application of the locking force tends to wedge the tapered portions of the pin into the internally tapered sleeves, thus rigidly holding the pin in accurate alignment between the two plates. The pin can be easily removed from its mounted position by merely removing the locking force.

BRIEF DESCRIPTION OF THE DRAWINGS

The preferred embodiment of the present invention will be described in conjunction with the accompanying drawings in which.

DESCRIPTION OF THE PREFERRED EMBODIMENT

Figure 1:
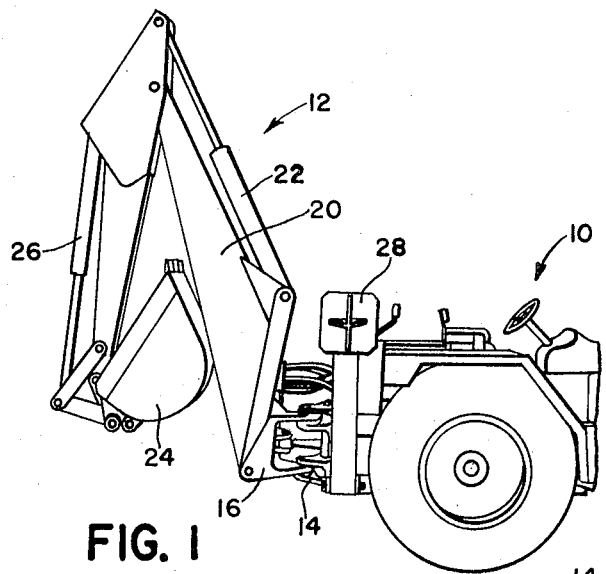
FIG. 1 is a side view of the rear portion of a tractor fitted with a swing-type backhoe utilizing the present invention.

The invention is illustrated in the drawings as applied to secure he trunnion pins which support the hydraulic swing cylinders utilized on a swing-type backhoe, such as that disclosed in U.S. Pat. No. 3,047,171 issued to Long. Such a backhoe is shown generally in FIG. 1, attached to the rear portion of a conventional industrial tractor 10. The backhoe 12 comprises, generally, a stationary tractor-mounted frame 14; a boom support frame 16 swingably mounted on the stationary frame for relative movement about a generally vertical axis 18; a boom 20 mounted on the boom frame 16 and operable in a conventional manner by means of hydraulic ram 22; and a scoop or bucket 24, mounted on the outermost end of boom 20 and operable in a conventional manner by means of hydraulically actuated jackstands 28, only one being shown in FIG. 1 in its raised, inoperative position.

Figure 2:
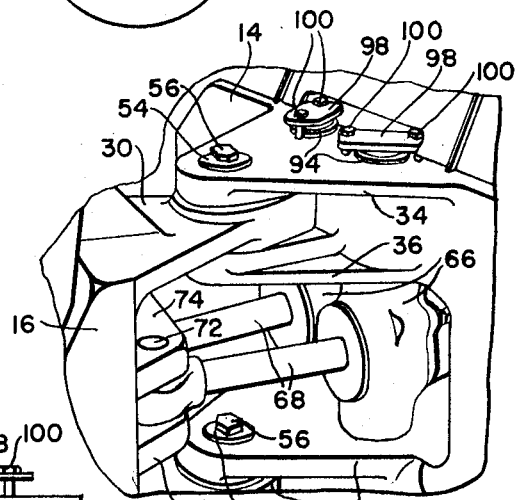
FIG. 2 is a perspective of the swing mounting of the backhoe, showing the swing cylinders or rams which are secured by means of the present invention.
Figure 3:
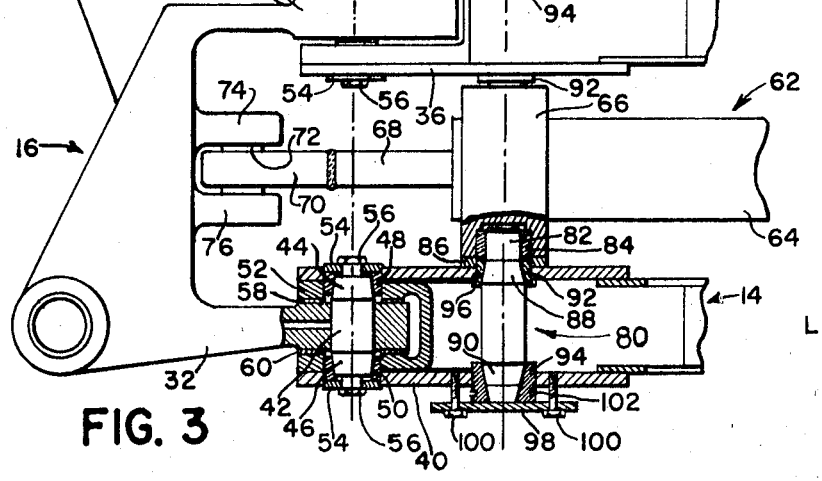
FIG. 3 is a side view of that portion of the backhoe mounting illustrated in FIG. 2, showing the pin-mounting means of the present invention in cross section.

The swing mounting of the backhoe is illustrated in detail in FIGS. 2 and 3. Boom support frame 16 has upper and lower arms 30 and 32, respectively, which are mounted between structural member walls or plates 34, 36 and 38, 40, respectively, on stationary frame 14, for swingable movement about vertical axis 18. Since the upper and lower mountings are substantially identical, only the lower mounting, shown in cross section in FIG. 3, will be described, it being understood that the description is analogously applicable to the upper mounting as well. As shown in FIG. 3, pin 42, having tapered end portions 44 and 46, if fitted with complementary internally tapered sleeves 48 and 50, respectively, which are, in turn, received in aligned apertures in plates 38 and 40 and the upper and lower portions of reinforcing member 52. Pin 42 is held in place with caps 54 and bolts 56 cooperating with suitably threaded apertures in the end portions of pin 42. As bolts 56 are tightened, sleeves 48 and 50 are wedged between pin 42 and the walls of the aperture in plates 38, 40 and reinforcing member 52, thus holding the pin rigidly in place. Boom frame 16 is maintained in proper vertical position by means of upper and lower thrust washer 58 and 60, respectively, located between the upper and lower surfaces of arm 32, and the upper and lower portions, respectively, of member 52.

In operation, boom support frame 16 and its associated structure is pivoted about axis 18 by the action of hydraulic swing cylinders 62. Each cylinder is mounted laterally from axis 18 and is comprises, generally, of a cylinder portion 64, a cylinder mounting head 66, a piston rod 68, and a piston rod end 70. The cylinder portion 64 is mounted between upper plates 34 and 36 and lower plates 38 and 40 on stationary frame 14 as will be described in detail below. Rod end 70 is pivotally held by pin 72 extending between upper and lower brackets 74 and 76, respectively, on the center portion of boom frame 16. It is thus apparent that when one of the hydraulic rams 62 is extended and the other retracted, boom 20 will swing in the appropriate direction about axis 18, and, conversely, when the movement of the rams 62 is reversed, boom 20 will swing in the opposite direction. A suitable hydraulic system for effectuating such extension and retraction of the hydraulic rams 62, not material to the present invention, is disclosed in U.S. Pat. No. 3,047,171 issued to Long.

It will be seen that each ram or swing cylinder 62, during extension and retraction, will pivot in a limited arc about axis 78, defined by the mounting of ram 62 on stationary frame 14. To accommodate this pivotal movement, cylinder mounting head 66 of ram 62 is mounted on upper and lower trunnion pins 80. Since the upper and lower trunnion pin mountings are substantially identical, it is sufficient for purposes of this disclosure to describe only the lower mounting shown in cross section in FIG. 3, it being understood that the description applies analogously to the upper mounting as well.

Cylinder mounting head 66 is provided with appropriate recesses in its upper and lower portions for receiving end portion 82 of pin 80, in journal 84. A bearing plate 86 is affixed to the upper surface of mounting plate 38 to accommodate the axial thrust resulting from the weight of ram 62. Trunnion pin 80, having tapered end portions 88 and 90, is itself mounted between plates 38 and 40 of stationary frame 14 on internally tapered sleeves 92 and 94. Sleeves 92 and 94 are, in turn, received in appropriate apertures in plates 38 and 40 respectively, such that they are generally free to move along axis 78. As shown in FIG. 3, however, sleeve 92 has a shoulder portion 96 which restricts its movement in a direction away from mounting plate 40. Pin 80 and sleeves 92 and 94 are held rigidly in place by means of locking cap 98 and bolts 100. Bolts 100 cooperate with suitably threaded apertures in mounting plate 40 to urge locking cap 98 against sleeve 94, which, in turn, acts to urge pin 80 against sleeve 92. Since the movement of sleeve 92 is restricted by shoulder 96 contacting the lower surface of plate 38, further application of this tightening force tends to wedge tapered end portions 86 and 88 of pin 80 into the internally tapered sleeves 92 and 94 respectively, and thus rigidly hold pin 80 in accurate alignment with axis 78.

Pin 80 can be removed from its mounted position by loosening bolts 100, thus relieving the locking force exerted on sleeve 94. A groove or indentation 102 is provided in sleeve 94 to facilitate the removal of the sleeve from plate 40. A special tool (not shown) can be used in association with plate 40 to extricate sleeve 94 from its wedge position. It should be noted that the aperture in plate 40, receiving sleeve 94, is sufficiently large to accommodate the removal of pin 80 and sleeve 92.

What is claimed is:

1. Structure for supporting a member for movement about an axis comprising: a pair of supports disposed on opposite side of the member, each support having inner and outer walls adjacent to and spaced outwardly from, respectively, the member, said walls having aligned pin-receiving apertures therein; a pair of axially aligned mounting pins extending through the apertures in the walls of the supports and having inner end portions extending inwardly of the inner walls thereof, each of said pins including an inwardly converging tapered portion spaced inwardly from its inner end portion, the member being mounted on the inner end portions of the pins for pivotal movement about the axis thereof; a pair of sleeves slidably received in the apertures in the inner walls of the supports, each of said sleeves having an inwardly converging tapered bore receiving the inwardly converging tapered portion of its respective pin; means for limiting the inward axial movement of the sleeves relative to their respective supports; and urging means acting between the outer walls of the supports and the pins to urge the latter axially inwardly.

2. The invention defined in claim 1 wherein each of said sleeves includes a shoulder portion engageable with its respective inner wall to limit the inward axial movement of the sleeve.

3. The invention defined in claim 1 wherein said urging means comprises a pair of members in engagement with the outer end portions of said pins, and threaded fastener means connecting said members with the outer wall of their respective supports.

4. The invention defined in claim 1 wherein the aperture in the outer wall of each support is sufficiently large to permit ingress and egress of the pin carried by the support and its respective sleeve.

5. The invention defined in claim 1 wherein each of the said pins includes an outwardly converging tapered portion spaced outwardly from its inwardly converging tapered portion; and wherein said urging means comprises a pair of second sleeves slidably received in the apertures in the outer walls of the supports, each of said second sleeves having an outwardly converging tapered bore receiving the outwardly converging tapered portion of its respective pin and means acting between each of the outer walls and its respective second sleeve for urging the latter axially inwardly.

6. Structure for supporting a member for movement about an axis comprising: a pair of supports disposed on opposite sides of the member, each support having inner and outer walls adjacent to and spaced outwardly from, respectively, the member, said walls having aligned, pin-receiving apertures therein; a pair of axially aligned mounting pins extending through the apertures in the walls of the supports and having inner end portions extending inwardly of the inner walls and pivotally supporting the member therebetween, each of said pins having an inwardly converging tapered portion spaced inwardly from its inner end portion and an outwardly converging tapered portion spaced outwardly from its inwardly converging portion; a pair of first sleeves slidably received in the apertures in the inner walls of the supports, each of said first sleeves having an inwardly converging tapered bore receiving the inwardly converging tapered portion of its respective pin; a pair of second sleeves slidably received in the apertures in the outer walls of the supports, each of said second sleeves having an outwardly converging tapered bore receiving the outwardly converging tapered portion of its respective pin; means for limiting the inward axial movement of the first sleeves relative to their respective supports; and urging means acting between each of the outer walls and its respective second sleeve for urging the latter axially inwardly.

7. The invention defined in claim 3 wherein the aperture in the outer wall of each support is sufficiently large to permit ingress and egress of the pin carried by the support and its respective first sleeve.

* * * * *